Nov. 4, 1952 — A. G. ROSE ET AL — 2,616,652
FEEDING OF POWDER AND LIKE FLUENT MATERIALS IN EQUAL QUANTITIES
Filed May 3, 1950 — 4 Sheets-Sheet 2

Inventors
A.G. Rose.
J.A. Kay.
J. Page.
By Semmes, Keegin, Robinson & Semmes Attorney Inventors
A. G. Rose.
J. A. Kay.
J. Page.

Inventors
A.G. Rose.
J.A. Kay.
J. Page.

Patented Nov. 4, 1952

2,616,652

UNITED STATES PATENT OFFICE 2,616,652

FEEDING OF POWDER AND LIKE FLUENT MATERIALS IN EQUAL QUANTITIES

Alfred German Rose, James Arthur Kay, and James Page, Gainsborough, England, assignors to Rose Brothers (Gainsborough) Limited, Gainsborough, England, a British company Application May 3, 1950, Serial No. 159,782
In Great Britain May 6, 1949

5 Claims. (Cl. 249—3)

1

This invention relates to the feeding of powder and like fluent materials such as granulated, flaky or similar materials, in substantially equal quantities. Such materials will be referred to hereinafter as "powder."

When feeding powder in substantially equal quantities by volume, it is sometimes found that, whilst the quantities fed remain substantially equal by volume, the weight of the volume changes from time to time for a variety of reasons depending to some extent on the kind of powder being fed. Thus, powder of a given kind may vary in density by reason of atmospheric charges or by variation in the size of the individual particles making up the powder; or again by the degree of aeration given to the powder by turbulence during the feeding operation.

An object of the invention is to vary the volume of the quantities of powder fed in accordance with variation of weight of the volume so that the quantities fed will be substantially equal in weight.

This object is achieved according to the invention by feeding powder in successive quantities substantially equal by volume, periodically weighing a given volume of the powder (which may be one of the successive quantities fed or one drawn directly from the source of supply), and automatically varying the volume of the quantities fed in response to the weighing action in accordance with any variation in weight of the given volume so as to maintain the weight of the quantities fed at a substantially constant and predetermined amount.

In apparatus for feeding powder by volume into cartons or other containers, the powder is normally allowed to flow from a stationary hopper through a succession of moving funnels from which it flows into the containers which are arranged with their open ends over the mouths of the funnels and arranged to move with the funnels, the volume fed to each container being regulated by various means such as variation in speed of the funnels past the mouth of the hopper or by a feed regulating device in the hopper.

According to the present invention, apparatus for feeding powder into cartons or the like comprises a stationary hopper or supply line from which powder is fed into a succession of subsidiary hoppers carried by a movable member and normally closed towards their outlet ends by movable base members each subsidiary hopper being adapted to hold a charge of powder corresponding to the amount required to be delivered to a carton, said subsidiary hoppers having

2 a telescopic construction so that their capacity can be varied by adjustment, means for periodically weighing a given volume of powder, and means responsive to the weighing action of the weighing means for automatically adjusting the capacity of said subsidiary hoppers in accordance with any variation in weight of the given volume so as to maintain the weight of the quantities fed at a substantially constant and predetermined amount.

The weighing means may be in the form of a beam balance of conventional design the "pan" of which may be formed with a movable base for the purpose of discharging the contents after each weighing operation.

The balance may be arranged to receive weighing charges of powder from a weighing hopper similar in construction to the subsidiary hoppers mentioned above and arranged for capacity adjustment therewith, the hopper being arranged to be filled in succession from the stationary hopper, the charges being conveniently discharged into the outlet portion of the stationary hopper after each weighing operation. Alternatively, the balance may be arranged to receive periodic charges directly from the subsidiary hoppers.

The invention will now be described, by way of example, in greater detail with reference to the accompanying drawings, as applied to a machine for packaging powder in cartons.

Figure 1:
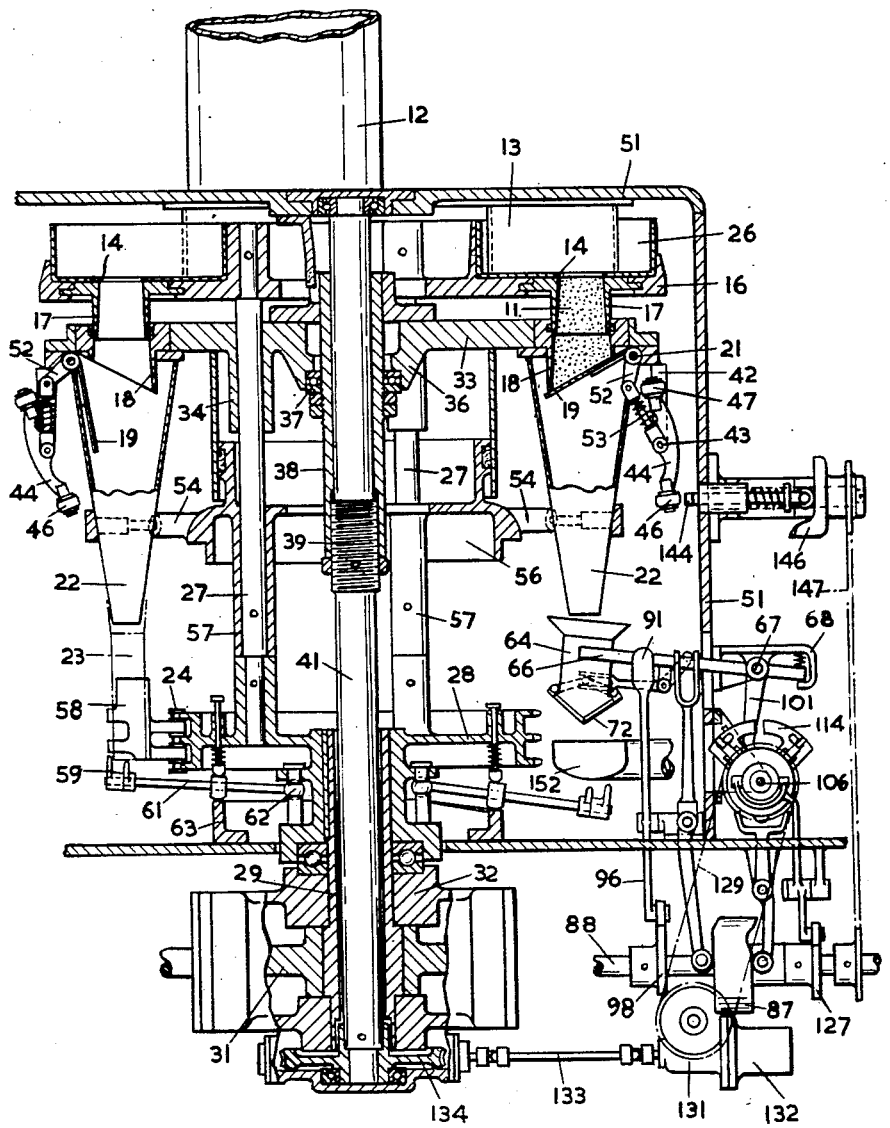
Figure 1 is a sectional elevation of such a machine.

Referring to the drawings, powder 11 flows from a supply pipe 12 into a collecting chamber 13 from which it passes through apertures 14 in a rotatable apertured wheel 16 into subsidiary hoppers 17, 18 having movable bases 19 pivoted at 21. The bases 19 are opened at intervals, as will be described, to allow the powder to fall into discharge chutes 22 leading to cartons 23 moved into position to receive the charges by a conveyor chain 24.

Figure 2:
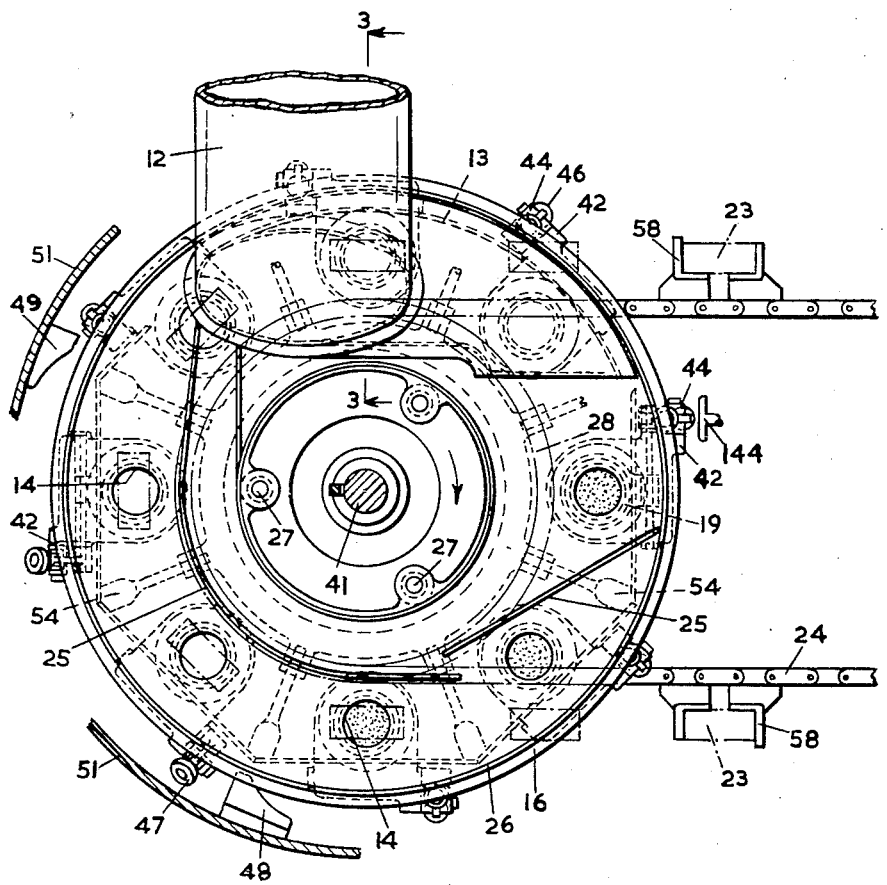
Figure 2 is a plan of the upper portion thereof, partly in section.
Figure 3:
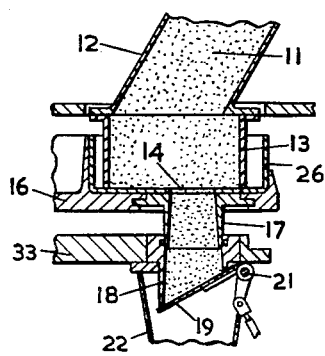
Figure 3 is a part sectional elevation taken on the line 3—3 in Figure 2.

As shown more particularly in Figures 2 and 3, the chamber 13 is arranged in an annular channel 26 the walls of which extend upwardly from the wheel 16, and in the base of which are formed the apertures 14. The chamber 13 forms with the base of the channel 26 an enclosed chamber through which the hoppers 17, 18, pass in succession, the chamber 13 being of such dimensions that a number of apertures 14 have access to the chamber at the same time. Filling of the hoppers 17, 18 thus taking place over the period of time required for the hopper to pass through the chamber. The forward wall of the chamber 13 acts as a scraper for the base of the channel 26, and auxiliary scrapers 25 are provided for sweeping any surplus powder into a portion of the channel clear of the apertures 14 and back to the chamber 13.

The wheel 16 is carried by a series of pillars 27 secured to and extending upwardly from a chain wheel 28 forming one of the supports for the conveyor chain 24. The chain wheel 28 is secured to a sleeve 29 extending upwardly from a wormwheel 31 rotatably mounted in a gear casing 32 and forming part of the main driving gear for the machine. The wheel 16 carries the upper portions 17 of the hoppers 17, 18, while the lower portions 19 (into which the upper portions 17 are telescoped) are carried by an adjusting wheel 33 formed with a series of depending bosses 34 by which it is slidably mounted on the series of pillars 27. The wheel 33 is formed with a central hub 36 by which it is supported on a thrust bearing 37 carried by an adjusting sleeve 38 making threaded engagement at 39 with an adjusting shaft 41 extending co-axially with the chain wheel 28.

The wheel 33 carries a series of depending brackets 42 (one for each hopper 17, 18) each pivotally supporting at 43 a two-armed lever 44 the arms of which carry cam rollers 46 and 47 arranged, respectively, to engage stationary cams 48 and 49 mounted on the main framework 51 of the machine. The bases 19 of the hoppers 17, 18 are provided with arms 52 each of which is pivotally connected to a spring toggle member 53 carried by the lever 44. It will thus be seen that, as the rollers 46 and 47 engage the cams 48 and 49, the bases 19 are opened or closed, as the case may be.

The chutes 22 are carried by arms 54 extending radially from a supporting ring 56 having a series of depending bosses 57 by which it is secured to the pillars 27. The chain wheel 28 thus drives the wheels 16 and 33 and the ring 56 simultaneously.

The cartons 23 are guided into pockets 58 carried by the chain 24 in well known manner, the pockets 58 being provided with supporting bases 59 carried on arms 61 pivoted at 62 on the sprocket 28 and extending radially therefrom. The arms 61 are raised by a stationary cam 63 as the cartons approach the filling position so that their open ends embrace the mouths of the chutes 22.

Arranged in register with the path of movement of the chutes 22 at a position remote from the filling position is a check-weighing and volume controlling device which will now be described.

Figure 4:
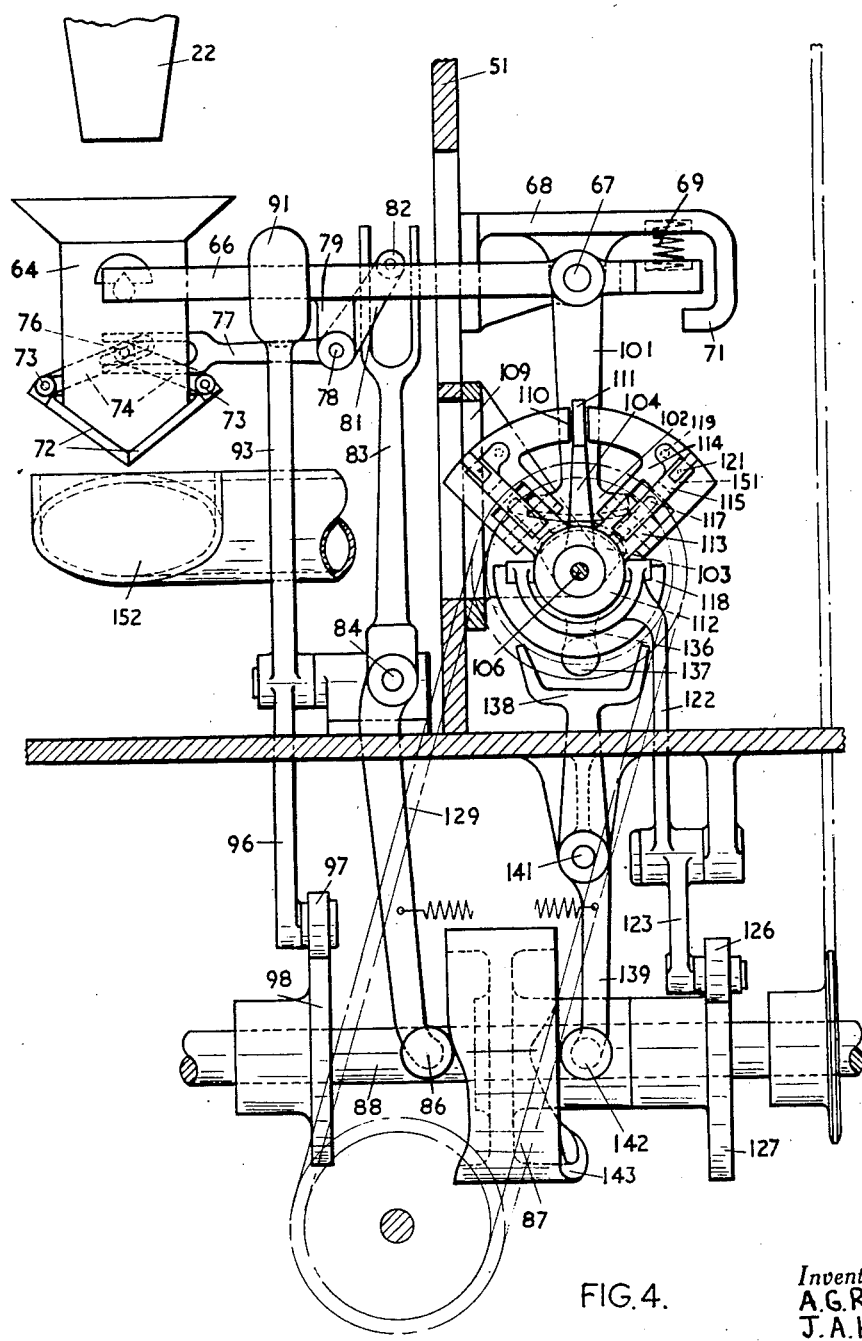
Figure 4 is an elevation of a portion of the apparatus shown in Figure 1, drawn to a larger scale.
Figure 5:
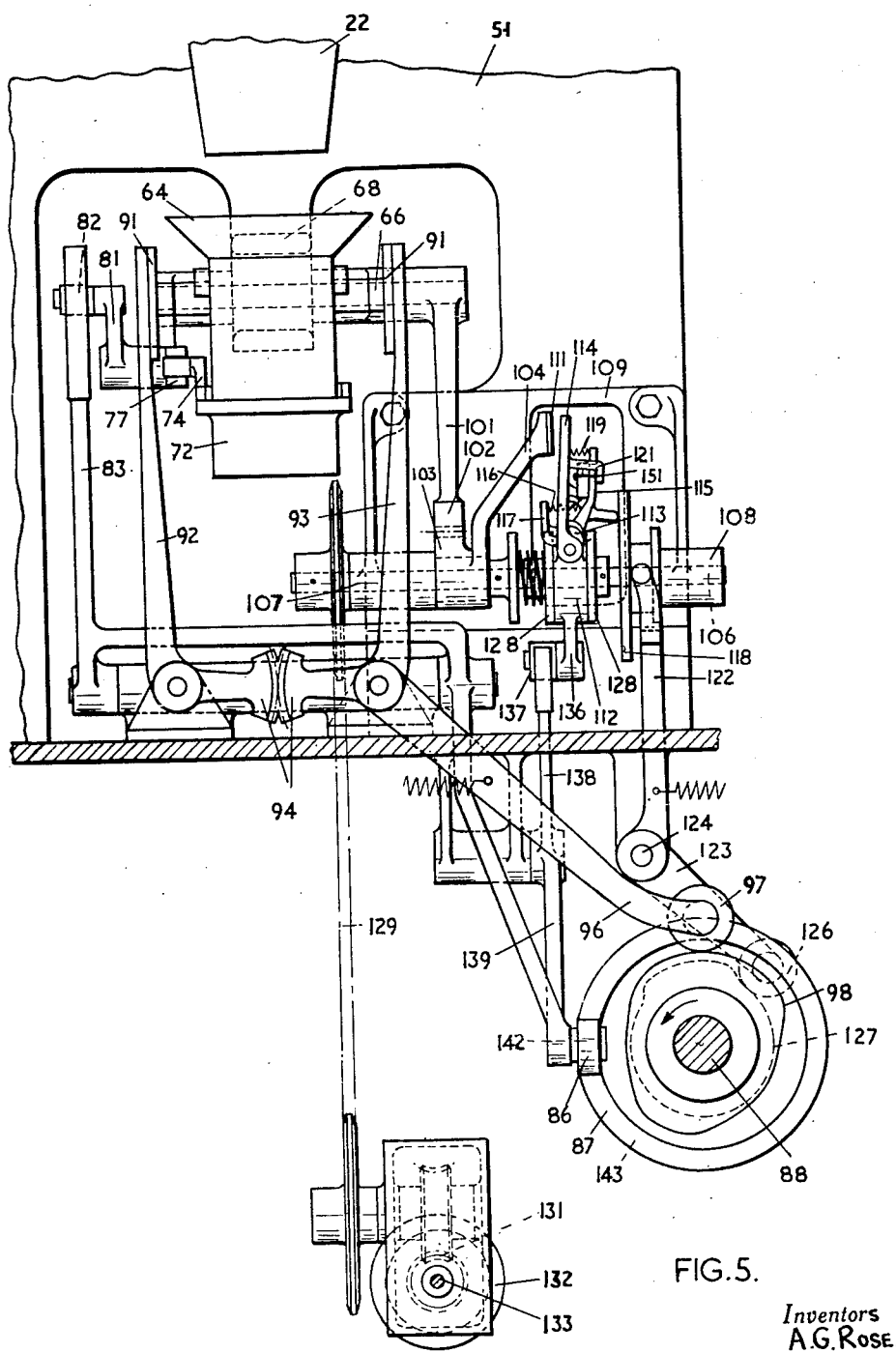
Figure 5 is an end elevation of the apparatus shown in Figure 4.

A scale pan 64 is mounted on a beam 66 pivoted at 67 on a bracket 68 secured to the framework 51 and spring-urged towards the "light" position by a spring 69, a limiting stop 71 being provided on the bracket 68. As shown in Figure 4, the beam 66 is shown in the neutral position, i. e., with a charge of powder of normal weight in the pan 64, while in Figure 1, it is shown in the in-operative position, i. e., with no charge in the pan 64. The base of the pan 64 is constituted by a pair of spring-loaded flaps 72 pivoted at 73 and provided with arms 74 connected by a pin and slot connection, one of the arms 74 carrying a roller 76 arranged to project into the forked extremity of an arm 77. The arm 77 is pivotally mounted at 78 on an extension 79 depending from the beam 66 and is provided with an operating arm 81 carrying a roller 82 arranged to project into the forked extremity of an actuating lever 83 pivoted at 84 and carrying a cam roller 86 arranged to bear against the face of a rotatable cam 87 secured to a cam shaft 88. The beam 66 is embraced by a pair of friction clamps 91 carried by friction levers 92 and 93 connected by racks 94, the lever 93 having an operating arm 96 carrying a cam roller 97 arranged to bear against the face of a rotatable cam 98 secured to the cam shaft 88. In order to allow sufficient time for accurate weighing of the charge, the cam shaft 88 is driven from the main driving gear of the machine through suitable reduction gear.

The beam 66 is provided with a depending arm 101 the free end of which is formed as an arcuate rack 102 arranged in engagement with a similar rack 103 formed on a controlling arm 104 freely mounted for pivotal movement about a shaft 106 rotatably mounted in bearings 107 and 108 carried by a supporting bracket 109, the bearing 107 being formed with a spigot on which the controlling arm 104 is mounted. Freely mounted on the shaft 106 adjacent the operative tip 111 of the arm 104 is a spider 112 formed with a pair of bearings 113 in which are pivotally mounted a pair of switch-actuating segments 114 separated by a gap 110 and a pair of corresponding switch-carrying arms 115, the latter being urged by springs 116, operating against abutments 117 on the spider 112, into contact with a disc 118 freely mounted on the shaft 106. Further springs 119 are arranged between the arms 115 and the segments 114 to urge the arms and segments apart, limit stops 121 being provided on the segments 114. The disc 118 is slidable on the shaft 106 by means of a two-armed lever 122, 123, pivoted at 124, the arm 123 carrying a cam roller 126 arranged to bear against the face of a rotatable cam 127 secured to the cam shaft 88.

Mounted on the shaft 106 are a pair of spring-loaded friction driving members 128 arranged in engagement with the faces of the spider 112, the shaft being driven by chain and sprocket gearing 129 from a gearing unit 131 driven by a reversible motor 132. A shaft 133 driven by the gearing unit 131 is arranged to drive the adjusting shaft 41 through worm reduction gearing 134.

For the purpose of re-setting the weighing apparatus, as will be described, the spider 112 is formed with an arm 136 carrying a roller 137 arranged in the forked extremity 138 of a re-setting arm 138, 139 pivoted at 141, the arm 139 carrying a cam roller 142 arranged to bear against a second cam surface 143 of the cam 87.

The bases 19 of the hoppers 17, 18 are normally opened and closed during each revolution of the wheel 16 by the cam members 48 and 49 as described above. Since the weighing operation takes place at intervals determined by the speed of the cam shaft 88, however, it is necessary to provide an auxiliary opening mechanism, operating in timed relationship with the weighing mechanism, for opening the hoppers 17, 18 to release weighing charges at the desired intervals. For this purpose a movable cam member 144 is operated, in timed relationship with the cam shaft 88, to move into the path of the rollers 47 by a rotatable cam 146 driven by chain and sprocket gearing 147 from the cam shaft 88.

In operation, the powder 11 is fed from the chamber 13 into the hoppers 17, 18 as described above, the hoppers discharging into successive cartons 23 upon opening of the bases 19 by the opening mechanism described above. The auxiliary opening gear described above is operated in timed relationship with the general operation of the machine by the cam shaft 88, so that, after a pre-determined number of cartons have been filled, the movable cam member 144 is actuated to open the base 19 of the adjacent hopper 17, 18 to cause the hopper to discharge into the scale pan 64. Substantially simultaneously with such discharge, the friction clamps 91 are operated by the cam 98 to grip the beam 66 to hold it against the weight of the charge. The clamps are then released and the beam allowed to settle in accordance with the weight of the charge dropped into the pan 64.

The weighing mechanism is initally adjusted so as to settle into the neutral position shown in Figure 4 when the charge delivered to the pan 64 is of "normal" weight, so that, when the given volume of powder delivered to the pan 64 differs from the "normal" weight because of variation in density, or for any other reason, the beam 66 will vary accordingly from the neutral position. When this happens, the arm 101 on the beam 66 causes the controlling arm 104 to move to one side or the other of the gap 110 between the segments 114 according as the charge is heavy or light. The segments 114 are identical in construction and operation, one operating the adjusting mechanism for increasing the volume of the charge and the other for decreasing the volume. It will only be necessary, therefore, to describe the adjusting operation in relation to one of the segments, e. g., the one causing a decrease in the volume delivered.

Assuming, therefore, that the charge delivered to the pan 64 is heavy, the arm 104 will move along the right hand segment (as viewed in Figure 4), and after a period, the disc 118 is moved by the cam 127 into engagement with the adjacent switch-carrying arm 115 so as to move that arm against the action of the spring 116 towards the segment 114, the further spring 119 causing the segment to move in the same direction until it abuts against the arm 104. The arm 115 then continues to move against the action of the spring 119 until a switch 151 abuts against the segment and is operated.

The switch 151 controls the movement of the motor 132 which is thus operated in the appropriate direction to drive the shaft 133 which through the worm gearing 134 causes the adjusting shaft 41 to rotate. This causes the sleeve 38 to rise so as to lift the wheel 33 carrying the lower portions 18 of the hoppers 17, 18, thus causing them to telescope into each other so as to reduce their volume. The amount of such adjustment is determined by a follow-up movement of the segments 114 brought about by the rotation of the shaft 106 by the motor 132 through the chain gearing 129, motion being transmitted to the spider 112 carrying the segments by the friction members 128. The follow-up motion continues until the gap 110 reaches the controlling arm 104, whereupon the segment 114 and the arm 115 are pressed apart by the spring 119, the gap 110 allowing the segments to embrace the arm 104, such movement disconnecting the switch 151 and thus stopping the motor 132. At or somewhat subsequent to this stage, the cam 127 operates to move the disc 118 away from the arm 115, thus allowing the spring 116 to move the arm 115 and the segment 114 (through the action of the stop 121) clear of the arm 104.

After the beam 66 has settled under the weight of the charge delivered to the pan 64, and before the follow-up mechanism operates, the clamping members 91 are again brought into clamping position and remain there during the operation of the follow-up mechanism. With the beam still clamped the arm 83 is operated by the cam 87 to open the flaps 72 to discharge the weighed charge into the inlet of a suction device 152 which serves to convey the powder back to the main supply line 12, the arm then closes the flaps. The clamping members are then released to allow the beam 66 to take up its unloaded position in readiness for the next weighing operation. The spider 112 is then "re-set" to its normal position by the arm 138 under the influence of the cam 143 and the controlling mechanism is ready for the next operation.

When a charge of normal weight is delivered to the pan 64, the segments 114, during their pivotal movement by the disc 118, pass on each side of the controlling arm 104 and the switches 151 remain inactive so that no adjustment of the apparatus takes place.

The invention thus provides an automatic mechanism capable of varying the volume of the hoppers 17, 18 in accordance with variations in the weight of the initial volume fed to the hoppers.

It will be understood that, while the check weighing mechanism has been described above as operating in association with the hoppers 17, 18 of the filling machine, the mechanism could be applied to a special hopper or hoppers for the purpose and having their charges delivered directly from the main supply line.

We claim:

1. Apparatus for feeding powder in successive quantities substantially equal by volume, comprising a source of supply of powder, a succession of subsidiary hoppers carried by a movable member and adapted to receive powder from said source of supply and deliver it to a discharge station, said hoppers having a telescopic construction so that their capacity can be varied by adjustment, means for simultaneously adjusting said hoppers, a weighing device including a beam balance adapted periodically to receive a given volume of powder, a controlling arm attached to said beam and adapted upon movement from a neutral position to initiate operation of means controlling said adjusting means, and a follow-up device actuated by said adjusting means for stopping the adjusting operation after a period determined by the amount of movement of said controlling arm.

2. Apparatus for feeding powder into cartons or like containers, comprising a source of supply of powder, a succession of subsidiary hoppers each formed in two parts telescoped into each other, the upper parts being mounted in a first rotatable wheel adapted to carry the hoppers in succession through the source of supply while the lower parts are mounted in a second wheel rotatable with the first wheel, said second wheel being adjustable axially with respect to said first wheel so as to vary the capacity of said hoppers, means for adjusting said second wheel, a weighing device including a beam balance adapted periodically to receive a given volume of powder, a controlling arm attached to said beam and adapted upon movement from a neutral position to initiate operation of means controlling said adjusting means, and a follow-up device actuated by said adjusting means for stopping the adjusting operation after a period determined by the amount of movement of said controlling arm.

3. Apparatus for feeding powder in successive quantities substantially equal by volume, comprising a source of supply of powder, a succession of subsidiary hoppers carried by a movable member and adapted to receive powder from said source of supply and deliver it to a discharge station, said hoppers having a telescopic construction so that their capacity can be varied by adjustment, means for simultaneously adjusting said hoppers, a weighing device including a beam balance adapted periodically to receive a given volume of powder, a controlling arm attached to said beam and adapted upon movement from a neutral position to initiate operation of means controlling said adjustable means, a follow-up device actuated by said adjusting means for stopping the adjusting operation after a period determined by the amount of movement of said controlling arm, and means for clamping the beam during operations of the weighing, adjusting and follow-up mechanisms.

4. Apparatus for feeding powder in successive quantities substantially equal by volume, comprising a source of supply of powder, a succession of subsidiary hoppers carried by a movable member and adapted to receive powder from said source of supply and deliver it to a discharge station, said hoppers having a telescopic construction so that their capacity can be varied by adjustment, means for simultaneously adjusting said hoppers, a weighing device including a beam balance adapted periodically to receive a given volume of powder, a controlling arm attached to said beam and adapted upon movement from a neutral position to initiate operation of means controlling said adjusting means, and a follow-up device actuated by said adjusting means for stopping the adjusting operation after a period determined by the amount of movement of said controlling arm, said follow-up device comprising a rotatable member driven by said adjusting means and carrying a pair of actuating members for said adjusting means, one or the other of said actuating members being arranged to be engaged by said controlling arm according as the given volume of powder is light or heavy so as to initiate operation of said adjusting means to increase or decrease the capacity of said hoppers.

5. Apparatus for feeding powder into cartons or like containers, comprising a source of supply of powder, a succession of subsidiary hoppers each formed in two parts telescoped into each other, the upper parts being mounted in a first rotatable wheel adapted to carry the hoppers in succession through the source of supply while the lower parts are mounted in a second wheel rotatable with the first wheel, said second wheel being adjustable axially with respect to said first wheel so as to vary the capacity of said hoppers, means for adjusting said second wheel, means for periodically weighing a given volume of the powder, and a follow-up device including a rotatable member driven by said adjusting means and carrying a pair of actuating members for said adjusting means, one or the other of said actuating members being arranged to be engaged by a controlling arm responsive to the weighing movement and adapted to initiate operation of said adjusting means, according as the given volume of powder is light or heavy, so as to bring about an increase or decrease in the capacity of said hoppers.

ALFRED GERMAN ROSE.
JAMES ARTHUR KAY.
JAMES PAGE.

REFERENCES CITED

The following references are of record in the file of this patent:

UNITED STATES PATENTS

| Number | Name | Date |
| --- | --- | --- |
| 928,658 | Hoyt | July 20, 1909 |
| 1,209,102 | Anschutz | Dec. 19, 1916 |
| 1,755,103 | Davis | Apr. 15, 1930 |
| 2,037,484 | Raymer | Apr. 14, 1936 |
| 2,503,295 | Palmer | Apr. 11, 1950 |